United States Patent [19]

Draper et al.

[11] Patent Number: 4,541,665
[45] Date of Patent: Sep. 17, 1985

[54] SUNROOF

[75] Inventors: David L. Draper, Hamburg; Gerald D. McKee, Highland, both of Mich.

[73] Assignee: Cars & Concepts, Inc., Brighton, Mich.

[21] Appl. No.: 664,865

[22] Filed: Oct. 25, 1984

Related U.S. Application Data

[63] Continuation of Ser. No. 333,647, Dec. 23, 1981, abandoned.

[51] Int. Cl.⁴ .............................................. B60J 7/00
[52] U.S. Cl. ..................................................... 296/218
[58] Field of Search ............... 296/218, 216, 213, 214, 296/222

[56] References Cited

U.S. PATENT DOCUMENTS

| | | | |
|---|---|---|---|
| 3,972,558 | 8/1976 | Horn | 296/213 |
| 4,115,955 | 9/1978 | Aldrich | 296/218 |
| 4,228,614 | 1/1984 | Vogel et al. | 296/218 |
| 4,289,349 | 9/1981 | Symeenidis | 296/213 |
| 4,337,975 | 7/1982 | Tamamushi | 296/215 |
| 4,342,481 | 8/1982 | Kanou | 296/218 |
| 4,346,932 | 8/1982 | Iwata | 296/218 |
| 4,351,560 | 9/1982 | Kanou | 296/216 |
| 4,351,561 | 9/1982 | Tuchiya | 296/216 |
| 4,358,153 | 11/1982 | Iwata | 296/213 |

Primary Examiner—Robert R. Song
Attorney, Agent, or Firm—Brooks & Kushman

[57] ABSTRACT

A vehicle sunroof of the pop-up type which can be pivoted to a partially opened position or alternatively may be completely removed from the vehicle. The sunroof assembly has a stamped metal tray which forms a drainage channel located below the surface of the vehicle roof, the roof opening being closed by a panel which is sealed relative to the tray to form a substantially closed drainage channel from which any accumulated moisture can be drained.

16 Claims, 4 Drawing Figures

SUNROOF

This is a continuation of co-pending application Ser. No. 333,647, filed on Dec. 23, 1981, now abandoned.

BACKGROUND OF THE INVENTION

1. Field of the Invention

This invention relates to sunroofs for vehicles and more particularly to pop-up sunroofs in which a panel covering an opening in the vehicle roof is tiltable to a partially opened position or is removable from the vehicle.

2. Description of the Prior Art

A variety of sunroofs have been provided, many of which have disadvantages such as the requirement of a heavy frame which changes the profile and appearance of a vehicle. When a lighter duty frame is used it permits deflection relative to the relatively thin metal roof panel which leads to leakage. In some sunroofs the panel, which is made of transparent material such as glass, is relied on to provide sealing surfaces and since glass is very deflectable the loads imposed in clamping the panel to a closed position lead to deformation and leakage.

SUMMARY OF THE INVENTION

It is an object of the invention to overcome the above mentioned and other disadvantages by the provision of an improved pop-up sunroof.

Another object of the invention is to provide a sunroof requiring a minimum of projection above the level of vehicle roof panel so that the profile of the vehicle retains substantially all of its original characteristics.

Another object of the invention is to provide a sunroof in which the sunroof is suspended relative to the vehicle in a manner which serves to reinforce the relatively easily deformable metal roof panel.

Yet another object of the invention is to provide a sunroof in which the hinge and latch arrangement by which a panel is held in position relative to an opening in the roof are supported in a manner minimizing the effects of loads on the covering panel or on the roof thereby avoiding leakage problems.

Another object of the invention is to provide a sunroof in which a drainage channel is formed around the opening in the roof of a vehicle and a seal arrangement maintains the channel in a substantially closed position requiring the bulk of moisture to be deflected from the vehicle and which permits the convenient diversion of any moisture which may reach the moisture accumulating channel.

The objects of the invention are accomplished by a vehicle sunroof supported relative to an opening in a sheet metal roof of a vehicle and which includes a metal tray forming a moisture accumulating channel located below the level of the roof and within the opening. The metal tray is supported from the roof panel by a flange lying on top of the vehicle roof which is formed of a material having a minimum thickness. The opening including the tray is covered by a transparent panel which has a primary seal between the tray and panel to prevent the entry of moisture to the interior of the vehicle. A secondary seal is provided between the panel and the tray to divert the majority of dirt and moisture. The tray and the panel are reinforced and the hinge and latch arrangement is so arranged that it applies a minimum of deflection to the relatively thin and flexible roof panel and to the deflectable glass panel. Provision is made for the drainage of any moisture which may accumulate in the substantially closed drainage panel so that it is diverted directly to the ground.

BRIEF DESCRIPTION OF THE DRAWINGS

The presently preferred embodiment of the invention is disclosed in the drawings in which.

DESCRIPTION OF THE PREFERRED EMBODIMENT

Figure 2:
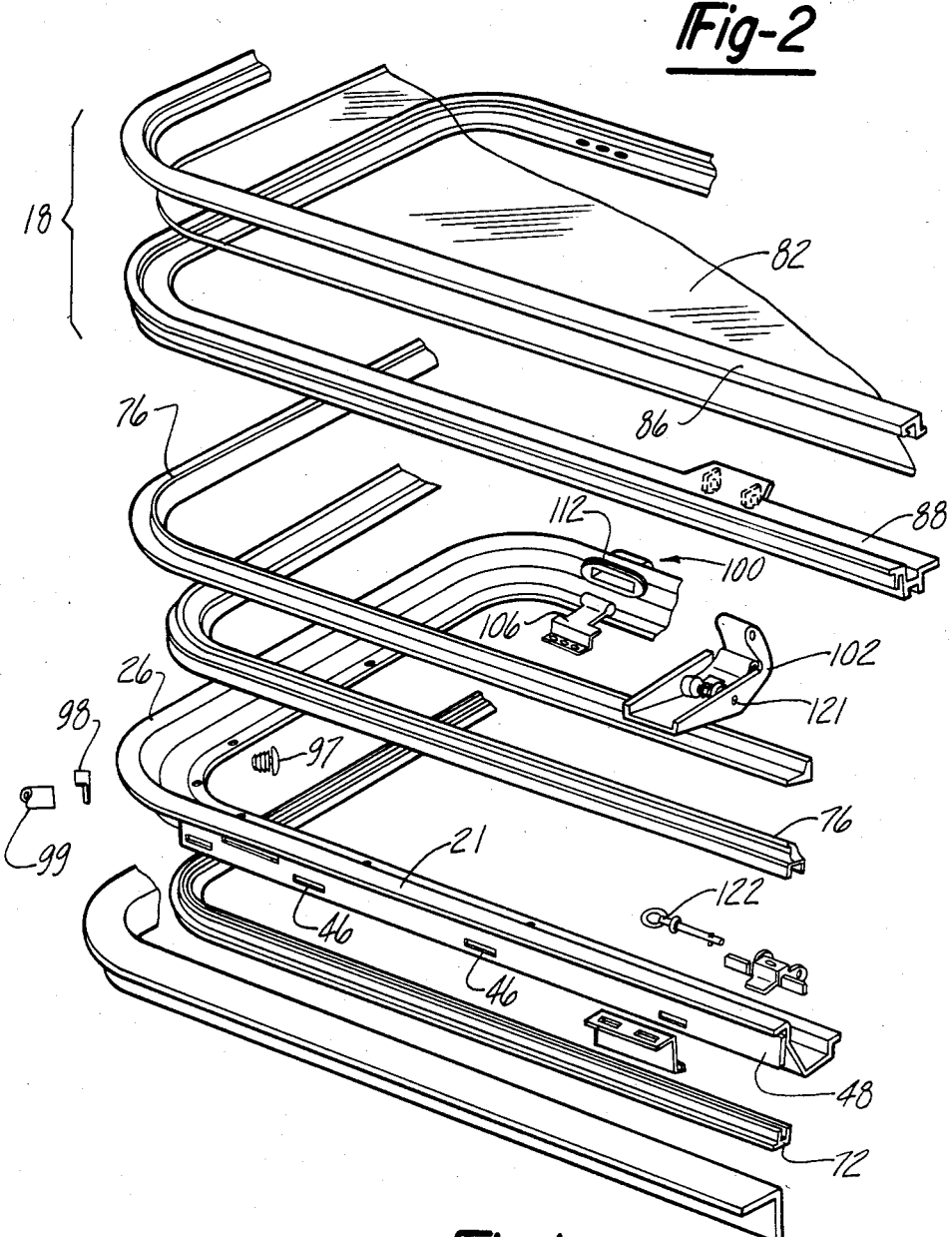
FIG. 2 is an exploded view of the various components of the sunroof which are installed in the vehicle.

A vehicle sunroof embodying the invention is designated generally at 10 and is shown in association with opening 12 in the roof 14 of a vehicle. In general the sunroof 10 includes a frame 16 fixed to the perimeter of the opening 12 which is covered by a closure panel 18 which can be moved from a closed position to a hinged, partially open position or which can be completely removed from the opening 12.

The roof 14 of the vehicle typically is made up of a thin sheet metal panel and sunroofs 10 typically are installed after the vehicle has been manufactured and sometimes at some substantial period after the vehicle has gone into use on the highway.

The installation of the sunroof 10 of the present invention, whether in a new vehicle or one which has been in use for a period of time, requires cutting of an opening 12 into the metal roof panel 14, perferably centrally of the vehicle and immediately above the forward seat. The perimeter of the opening 12 is surrounded by a continuous frame member or tray 24 which has an outwardly extending flange 26 adapted to abut the top of the roof panel 14. Extending downwardly from the flange 26 is an outer wall 28 which extends around the entire perimeter of the opening 12. The outer wall 28 merges with an inwardly sloping wall 30 and a horizontal, bottom wall 32. An inner vertical wall 34, extends from the bottom wall 32 and its upper end is provided with an inwardly directed flange 36. The entire tray 24 and particularly the flange 26 is made up of relatively thin metal of substantially the same thickness as the metal roof panel 14. The tray member 24 is stamped and forms a unitary tray in which the structure is supported from the top of the roof panel 14 of the vehicle and in which the space between the outer wall 28 and the vertical inner wall 34 form a trough 40. The trough 40 is disposed inwardly of the opening 12 and below the line of the roof panel 14.

Figure 3:
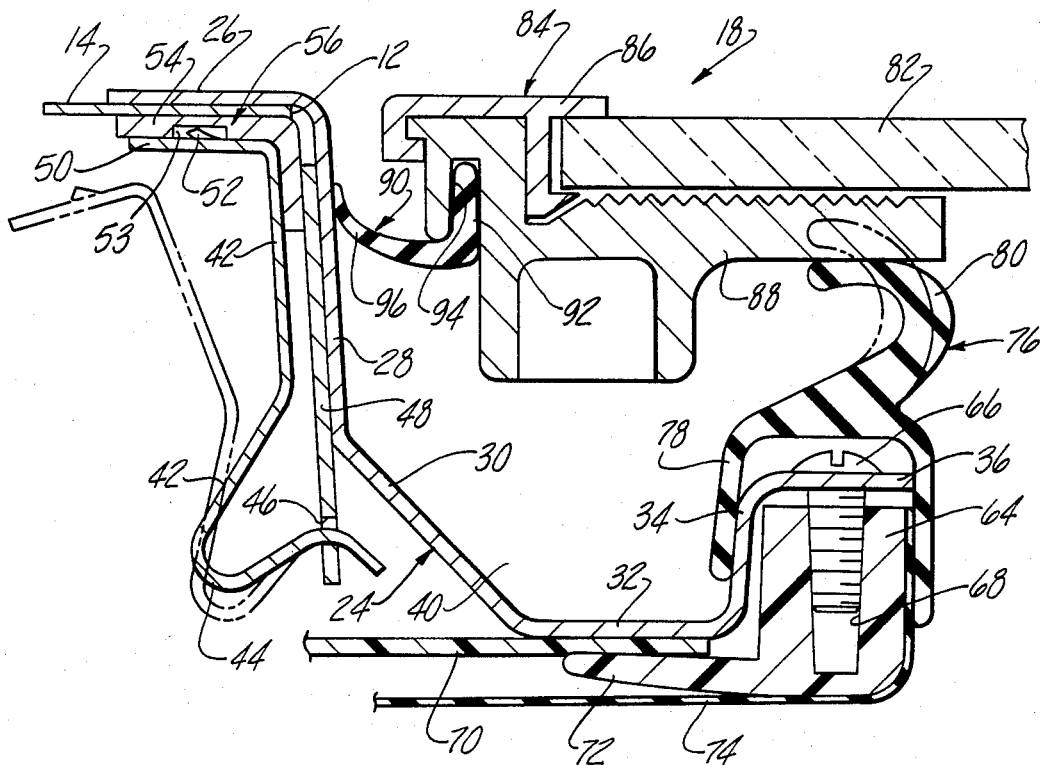
FIG. 3 is a cross-sectional view at a greatly enlarged scale of a section taken through one of the sides of the sunroof assembly.

As seen in FIG. 3, the tray 24 is rigidly secured to the roof panel 14 by attaching means which includes clips 42. The clips 42 are made of resilient, spring like material and have a curved lower end 44 adapted to be inserted in openings 46 in mounting bars 48 rigidly attached to the exterior of tray 24 by welding or the like. The upper end of the clips 42 are provided with an arm 50 having a retaining tab 52. The tab 52 is adapted to rest in a groove 53 formed in the underside of a horizontal flange 54 of a reinforcing ring 56. Reinforcing ring 56 is associated with the exterior perimeter of the opening 12 and is held in abutting relation with the underside of the roof panel 14. Both the metal panel 14 of the vehicle roof 14 and the tray 24 are formed of thin metal, to the order of 0.040 inches in thickness and as a consequence are relatively flexible. The reinforcing ring 56 lies in abutting relationship with the edges of the opening 12 and the spring like clips 42 can be moved from the position shown in brokenline to the full line position in which the tabs 52 are disposed in the groove 53. In that position the tray 24 is clamped in position relative to the metal roof panel 20 by means of the flange 26 on the outside of the roof panel and the arm 50 spring loaded by the curved end 44 against the underside of the ring 56. A plurality of clips are associated with each side of the tray 24 and ring 56. A particular advantage of the clips 42 and the mounting system employed with the present sunroof 10 is that installation can be made by a single person from either the exterior or the interior of the vehicle by simply placing the tray 24 in position in the opening 12 and subsequently installing clips 42 and moving them into engagement with the reinforcing ring 56 which can be temporarily held in position by one hand of the installer while the other is used to swing the clips into locked position.

The tray 24 supports a molding or trim member 64 which can be made of plastic material. The trim member 64 is held in position relative to the tray 24 by screw fasteners 66 passing through openings in the horizontal flange 36 and engaging to wedge in a groove 68 extending continuously around the trim member 64. The trim member 64 may be used to secure a headliner 70 made of relatively rigid material by clamping it between a flange 72 extending outwardly from the remainder of the trim member 64 to engage the underside of the headliner 70 to clamp it between the flange 72 and the bottom wall 32 of the tray 24. In the case of vehicles having soft headliners 74 the soft material can be folded over the outside of the trim member 64 and over the top of the groove 66 and can be held in position by adhesive. With either the hard headliner 70 or the soft headliner 74 the upper flange 36 is covered by a seal element 76.

The seal 76 is a continuous strip of elastomeric material having a channel portion 78 which extends over the top of flange 36 and engages the vertical wall 34 of the tray 24 and the outer perimeter of the trim member 64 and serves not only to hold the seal element in position but also to conceal the screw 66 and form a finishing element. The channel 78 is provided with a lip seal 80 formed integrally with the channel 78 and which is adapted to be deflected and to engage the underside of the panel assembly 18 to provide a tight seal to keep out water, dirt and air.

The panel 18 is preferably transparent and preferably is made of tempered glass 82. The entire perimeter of the panel 18 is surrounded by a frame assembly 84 which includes a plastic frame 86 which grips the edge of the glass 82 and fits over a supporting frame member 88 of extruded metal. The glass 82 is held relative to the plastic frame 86 and support frame 88 by means of transparent adhesive.

The frame assembly 84 is adapted to secure a second seal 90 which is generally L-shaped in cross section having one leg 92 pressed into a groove 94 of the support frame 88 and the other leg 96 forming a flexible lip adapted to engage and seal against the outer wall 28 of the tray 24.

In a closed position of the panel 18 relative to the opening 12, the seal element 76 is engaged with the underside of the support frame 88 and the seal 90 is engaged with the outer wall 28 so that the trough 40 is substantially enclosed. The bulk of rainfall or moisture deposited on the vehicle flows away over the surfaces of the vehicle and smaller amounts which may pass the seal 90 are trapped at least temporarily in the substantially closed trough 40.

Selected portions of the tray 24 such as the corners are provided with drain fittings which, as seen in FIG. 2, include a threaded nipple 97 held to the tray 24 by a nut 98 to receive a flexible tube 99. A length of tube 99 is located within vehicle cavities to divert accumulated moisture in trough 40 to the exterior road surface.

Figure 4:
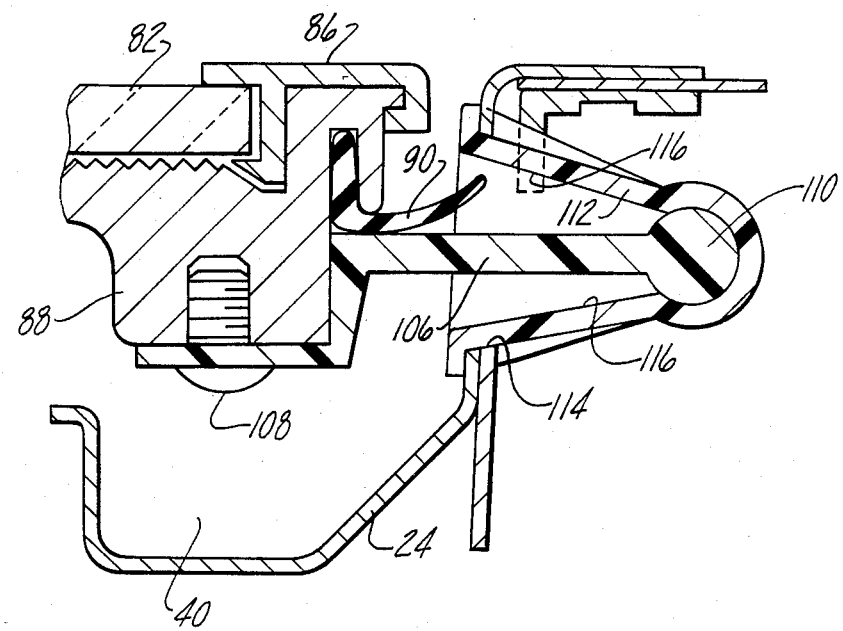
FIG. 4 is a cross-sectional view also at an enlarged scale of the hinge assembly by which the sunroof can be moved to a partially open position.

The panel 18 is attached to the frame 16 by a pair of hinge assemblies 100 associated with a forward edge of the panel 18 and a latch 102 associated with the rearward edge of the panel 18. As seen in FIG. 4, each hinge assembly 100 includes a forwardly projecting prong 106 attached to the panel 18 and more specifically to the support frame 88 by means of screw fasteners 108. The prong 106 has a cylindrical pivot portion 110 which fits into a complementary scabbard member 112 made of resilient material and fitted into openings 114 in the outer wall 28 of the tray 24. The scabbards 112 are open into the trough 40 and receive the pivot portion 110 on the prongs 106. The scabbards have diverging interior walls 116 which permit the panel 18 to pivot about the pivot portion 110. The scabbard 112 of resilient material also permits sufficient deformation so that the prongs 106 may be retracted from the sockets 112 so that the entire panel 18 may be removed from the vehicle roof 14.

Figure 1:
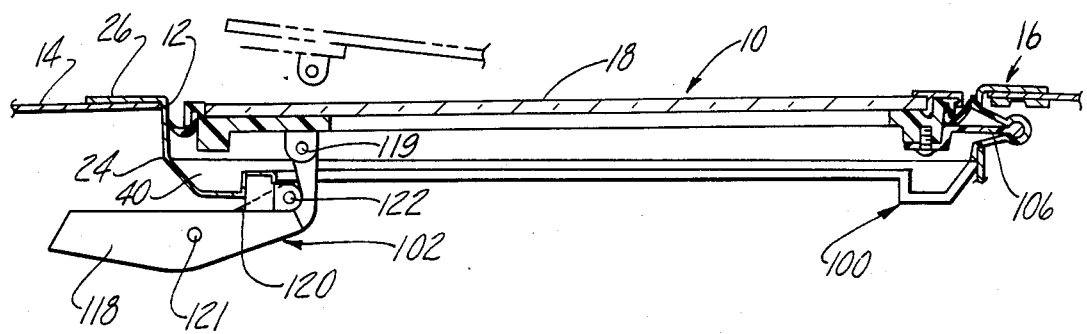
FIG. 1 is a cross-sectional view of a pop-up vehicle sunroof embodying the invention.

The latch mechanism 102 which acts to hold the panel 18 in tight sealing engagement with the seal element 76 is shown in FIG. 1 and is associated with the rear edge of the panel 18 and tray 24. In general the latch mechanism 102 is an overcenter linkage arrangement having a handle 118 pivoted by a pin 119 to the panel 18 and a link 120 having opposite ends pivoted to the handle 118 by a pin 121 and to the tray 24 by a quick release pin 122. The over center linkage arrangement permits pivoting of the panel about its hinge assemblies 100 from the full line position shown in FIG. 2 to the broken line position. In that position, panel 18 is maintained in a partially open position to permit ventilation of the passenger compartment of the vehicle. If desired, the quick release pin 122 can be removed permitting retraction of the prongs 106 from the scabbards 112 so that the entire panel 18 can be separated from the vehicle carrying with it the latch mechanism 102.

A pop-up vehicle sunroof has been provided in which an opening in the sheet metal roof of a vehicle is provided with a stamped metal tray which is supported from the top of the roof by means of a thin metal flange which minimizes the change in appearance and profile of the vehicle roof. The opening in the roof is covered by a panel which can be hinged to a partially open position or can be completely removed from the vehicle. In a closed position of the panel, a primary seal acts between the inner edges of the tray and panel and a secondary seal acts between the panel and the inner edge of the tray to provide a substantially closed drainage channel in which any moisture which accumulates can be diverted to the ground. Both the mounting of the frame or tray relative to the roof panel and the covering panel itself are reinforced in a manner to reduce deflections which might reduce seal effectiveness.

The embodiments of the invention in which an exclusive property or privilege is claimed are defined as follows:

1. A vehicle sunroof comprising: an opening in a sheet metal roof panel of a vehicle, a unitary stamped metal tray formed from sheet material and having a flange supported from the top of said roof panel, said tray having an inner wall, a bottom wall, and an outer wall, said walls of the tray forming a continuous trough around the roof opening at a location below said roof panel, mounting bars secured to the outer wall of the tray and having a plurality of clamp openings spaced about the tray around the roof opening; a plurality of clamps respectively associated with the clamp openings of the mounting bars; each clamp having a lower end received within the associated clamp opening to provide mounting thereof on the tray; each clamp also having an upper end that is located below the roof panel and moved into an opposed relationship with the tray flange to cooperate with the flange in clamping the roof panel therebetween in order to secure the tray to the roof panel, a transparent panel covering said opening and being supported for swinging movement between open and closed positions with respect to the roof opening, a first seal acting between the inner wall of said tray and the perimeter of said transparent panel when the latter is in the closed position, a second seal acting between the outer wall of said tray and the perimeter of said transparent panel when the latter is in the closed position, and said perimeter of said transparent panel, said seals and said trough forming a substantially closed drainage channel to receive and accumulate moisture.

2. The sunroof of claim 1 wherein said metal tray has a material thickness substantially equal to the thickness of said sheet metal roof panel.

3. The sunroof of claim 1 wherein said transparent panel has a frame around its entire perimeter, and wherein said seals extend between said frame and the walls of said trough in said tray with the transparent panel in the closed position.

4. The sunroof of claim 1 further comprising conduits extending from said trough for distributing accumulated moisture to the exterior of the vehicle.

5. The sunroof of claim 1 wherein said inner wall of said trough in the tray includes supports means for attaching a headliner to said tray.

6. The sunroof of claim 1 wherein each clamp comprises a clip whose lower end is pivoted relative to said tray within the associated mounting bar opening and whose upper end is swingable into engagement with and to clamp against the underside of said roof panel opposite said flange of the tray, and the upper end of each clip having a retaining tab that secures the clip in position.

7. The sunroof of claim 6 and further comprising a reinforcing member disposed between the underside of said roof panel and the upper end of said clip.

8. The sunroof of claim 7 wherein said reinforcing member has a groove extending longitudinally thereof and wherein said clip is provided with lock means to permit swinging movement in one direction and to prevent swinging movement in the opposite direction, said lock means being seated in the groove in said clip.

9. The sunroof of claim 1 wherein said first seal is supported on said inner wall of said tray and said second seal is supported on the perimeter of said transparent panel.

10. The vehicle sunroof of claim 1 and further comprising hinge means between said transparent panel and said tray for swinging movement of said transparent panel between the open and closed positions.

11. The vehicle sunroof of claim 10 wherein said hinge means comprise a pair of pivot members supported on said transparent panel and a pair of sockets for receiving said pivot members, said sockets being supported on said tray.

12. The vehicle sunroof of claim 11 wherein said pivot members and said sockets of the hinge means permit detachment of said transparent panel and said tray for removal of said transparent panel from said opening.

13. The vehicle sunroof of claim 11 wherein said sockets have an opening for receiving said pivot members and wherein said opening is opened to said trough of the tray.

14. The vehicle sunroof of claim 10 and further comprising latch means on an edge of said transparent panel and tray opposite to said hinge means.

15. A vehicle sunroof comprising: a vehicle roof panel defining an opening; a unitary metal tray formed from sheet material and having an outer flange supported on the top of the roof panel adjacent the opening; said tray including an inner wall, an outer wall, a bottom wall that cooperate to define a trough of an upwardly opening shape extending around the periphery of the roof opening at a location below the roof panel; mounting bars secured to the outer wall of the tray and having a plurality of clamp openings spaced about the tray around the roof opening; a plurality of clamps respectively associated with the clamp openings of the mounting bars; each clamp having a lower end received within the associated clamp opening to provide mounting thereof on the tray; each clamp also having an upper end that is located below the roof panel and moved into an opposed relationship with the tray flange to cooperate with the flange in clamping the roof panel therebetween in order to secure the tray to the roof panel; a closure panel for closing the roof opening; a hinge assembly and a latch mechanism that cooperate to support the closure panel for movement on the roof panel between open and closed positions with respect to the opening; a first seal that extends between the inner wall of the tray and the perimeter of the closed closure panel; a second seal that extends between the outer wall of the tray and the perimeter of the closed closure panel; and the perimeter of the closed closure panel, the seals, and the trough defining a substantially closed drainage channel for moisture.

16. A vehicle sunroof comprising: a vehicle roof panel defining an opening; a unitary metal tray formed from sheet material and having an outer flange supported on the top of the roof panel adjacent the opening; said tray including an inner wall, an outer wall, and a bottom wall that cooperate to define a trough of an upwardly opening shape extending around the periphery of the roof opening at a location below the roof panel; mounting bars secured to the outer wall of the tray and having a plurality of clamp openings spaced about the tray around the roof opening; a plurality of clamps respectively associated with the clamp openings of the mounting bars; each clamp having a lower end received within the associated clamp opening to provide mounting thereof on the tray; each clamp also having an upper end that is located below the roof panel and moved into an opposed relationship with the tray flange to cooperate with the flange in clamping the roof panel therebetween in order to secure the tray to the roof panel; a glass panel for closing the roof opening; a frame on the perimeter of the glass panel; a hinge assembly and a latch mechanism that cooperate to mount the glass panel frame to support the glass panel for movement on the roof panel between open and closed positions with respect to the opening; said hinge assembly and latch mechanism each having detachable components to permit removal of the glass panel from the roof panel to completely open the roof opening; a first seal that extends between the inner wall of the tray and the frame of the closed glass panel; a second seal that extends between the outer wall of the tray and the frame of the closed glass panel; and the perimeter of the closed glass panel and frame thereof, the seals, and the trough cooperatively defining a substantially closed drainage channel for moisture.

* * * * *